(12) United States Patent
Bowen et al.

(10) Patent No.: US 8,570,150 B1
(45) Date of Patent: Oct. 29, 2013

(54) SENSING SYSTEM AND METHOD WITH INTEGRAL SENSOR LOCATING CAPABILITY

(76) Inventors: Doug Bowen, Spanish Fork, UT (US); Thomas R. Giallorenzi, Sandy, UT (US); Matt Lake, Salt Lake City, UT (US); Sam Kingston, Salt Lake City, UT (US)

( * ) Notice: Subject to any disclaimer, the term of this patent is extended or adjusted under 35 U.S.C. 154(b) by 881 days.

(21) Appl. No.: 12/350,074

(22) Filed: Jan. 7, 2009

(51) Int. Cl.
*G08B 25/10* (2006.01)

(52) U.S. Cl.
USPC ............ 340/8.1; 342/355; 342/422; 342/423; 342/424; 342/444; 342/463; 342/465; 348/143; 348/160

(58) Field of Classification Search
USPC ......... 342/355, 422, 423, 424, 444, 463, 465; 340/8.1; 348/143–160
See application file for complete search history.

(56) References Cited

U.S. PATENT DOCUMENTS

| | | | | |
|---|---|---|---|---|
| 3,714,573 A | * | 1/1973 | Grossman | 342/387 |
| 4,652,884 A | * | 3/1987 | Starker | 342/357.62 |
| 4,759,034 A | * | 7/1988 | Nagazumi | 375/142 |
| 4,969,159 A | * | 11/1990 | Belcher et al. | 375/153 |
| 6,169,497 B1 | * | 1/2001 | Robert | 340/988 |
| 6,204,813 B1 | * | 3/2001 | Wadell et al. | 342/463 |
| 6,324,392 B1 | | 11/2001 | Holt | |
| 6,366,600 B1 | * | 4/2002 | Agrawal et al. | 375/130 |
| 6,600,774 B1 | | 7/2003 | Otto | |
| 6,750,818 B2 | | 6/2004 | Thomas et al. | |
| 6,861,982 B2 | * | 3/2005 | Forstrom et al. | 342/387 |
| 6,898,197 B1 | | 5/2005 | Lavean | |
| 6,914,560 B2 | | 7/2005 | Spilker, Jr. et al. | |
| 6,980,527 B1 | | 12/2005 | Liu et al. | |
| 7,030,811 B2 | | 4/2006 | Goren et al. | |
| 7,126,536 B2 | | 10/2006 | Rabinowitz et al. | |
| 2006/0022873 A1 | | 2/2006 | Zimmerman | |

OTHER PUBLICATIONS

Wikipedia, Multilateration, http://en.wikipedia.org/wiki/multilateration, Apr. 8, 2008, pp. 1-4.
Wikipedia, Trilateration, http://en.wikipedia.org/wiki/trilateration, Apr. 8, 2008, pp. 1-3.
Designing a Low-Cost, Low-Component-Count GPS Receiver, Dallas Semiconductor Maxim, Nov. 13, 2006, pp. 1-3.
U.S. Appl. No. 11/540,139, filed Sep. 28, 2006, Giallorenzi.
U.S. Appl. No. 11/540,136, filed Sep. 28, 2006, Giallorenzi.

\* cited by examiner

*Primary Examiner* — Daniel Wu
*Assistant Examiner* — John Bamert
(74) *Attorney, Agent, or Firm* — Kirton McConkie

(57) ABSTRACT

A sensing system includes integrated sensor locating capability. Sensors can transmit spread spectrum encoded data pulses which are received at mobile nodes. Based on time of arrival information and known locations of the mobile nodes, locations of the sensors can be determined.

33 Claims, 5 Drawing Sheets

SENSING SYSTEM AND METHOD WITH INTEGRAL SENSOR LOCATING CAPABILITY

FIELD

The present application relates to sensing systems. More particularly, the present application relates to systems and methods for sensing with integral sensor locating capability.

BACKGROUND

Sensors and sensing systems are used in a number of applications, including surveillance, border protection, environmental monitoring, meteorology, and the like. As microelectronics have become smaller and less power hungry, it has become possible to deploy very small sensors for extended periods of times. For example, autonomous and mobile sensors can be deployed over a wide area to monitor for chemical, biological, or nuclear hazards. When a hazard is detected, it can be reported.

In many sensing systems, it is desirable to determine the location of the sensor making a report. Conventionally, many systems rely on Global Positioning System (GPS) receivers to determine location. In a GPS receiver, signals are received from a number of orbiting satellites, and processing is performed to determine the location of the GPS receiver. Unfortunately, GPS receivers tend to be relatively power hungry for a variety of reasons. While some GPS receiver designs have been developed which are suitable for battery-powered use, they tend to be have various limitations. For example, some receivers cannot operate for more than a few hours without depleting the batteries. Some receivers can be turned off to conserve battery power, but if left off for an extended period of time (e.g., days or months) it can take a long time to resynchronize to the satellites and obtained a position fix. GPS can also suffer problems in that the accuracy of a position fix can be degraded when only a few satellites are within visible range, obstructions are present (e.g., thick forest canopy, buildings, etc.), or when the system is intentionally degraded (e.g., through jamming or enabling of the selective availability).

SUMMARY

It has been recognized that it would be advantageous to develop a technique for a sensing system to obtain position fixes on individual sensors without relying on GPS.

In some embodiments of the invention a method of determining a sensor location is provided. The method can include transmitting a spread spectrum encoded pulse from a sensor having sensor data encoded into the pulse. The pulse can be received at a number of mobile receivers. Each of the mobile receivers can determine a time of arrival of the spread pulse. Using known locations of the mobile receivers and the time of arrivals, a location of the sensor can be computed. The sensor data can be decoded at one or more of the mobile receivers.

In some embodiments of the invention a sensing system can include a number of sensors. Sensors can include a transmitter which transmits sensor data using a spread spectrum encoded pulse. The system can also include a number of mobile nodes which can receive spread spectrum encoded pulses form the sensors. The mobile nodes can determine time of arrival of spread pulses received from the sensors. A location calculation unit can use the time of arrival information for a transmission received from one of the sensors at multiple mobile nodes in combination with known locations of the mobile nodes to determine a location of the sensor.

In some embodiments of the invention a system for determining a sensor location can include means for transmitting a spread spectrum encoded pulse from a sensor, the spread spectrum encoded pulse having sensor data encoded therein. The system can also include means for receiving the pulse from a number of locations. The locations can be different from each other, varying over time, and known. The system can also include means for determining a time of arrival of the pulse at each of the locations. The system can also include means for computing a location of the sensor based on the time of arrival of the spread pulse at each of the locations.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENT(S)

Figure 1:
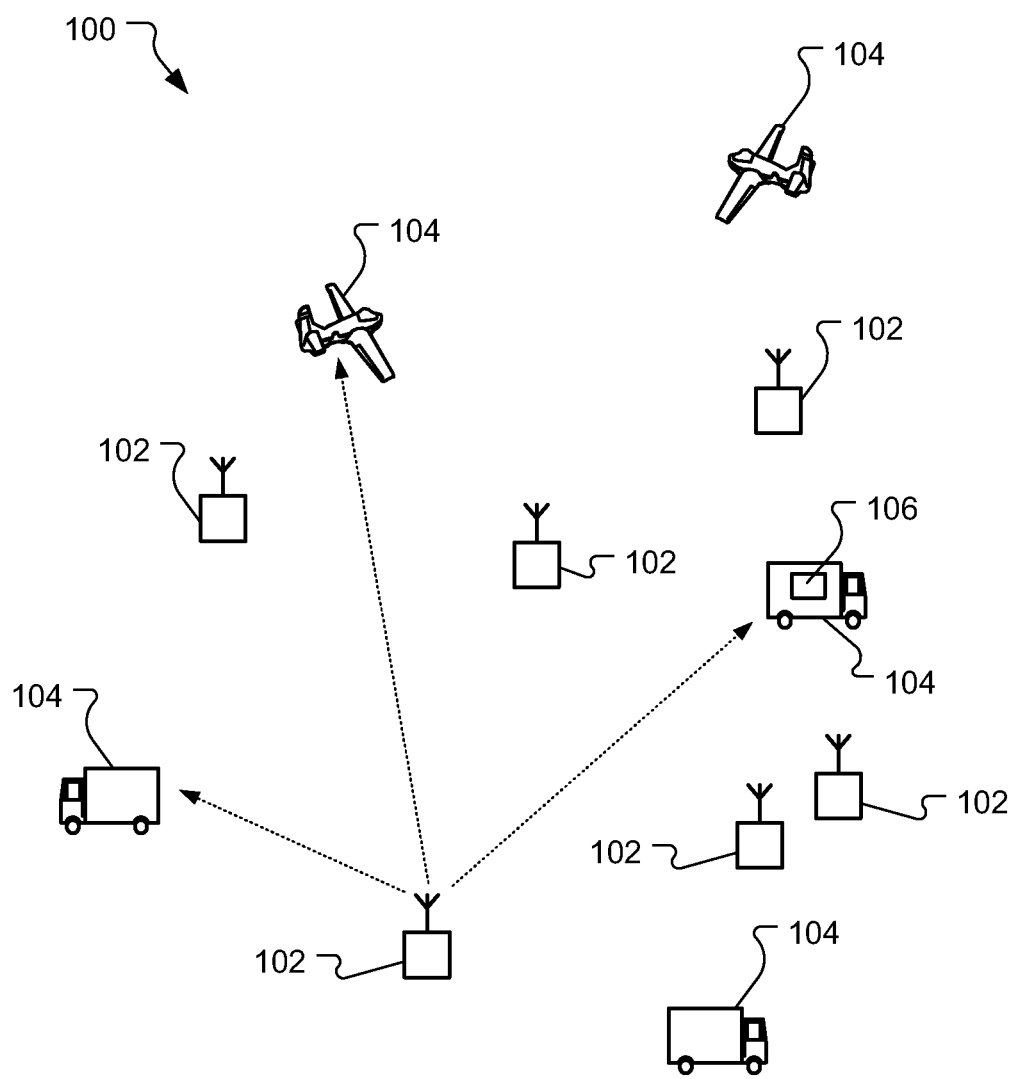
FIG. 1 is a block diagram of a sensor system in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a sensor includes reference to one or more sensors.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

By the term "substantially" is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also as including all the individual numerical values or sub-ranges encompassed within that range as if each numerical value and sub-range is explicitly recited. As an illustration, a numerical range of "about 1 to 5" should be interpreted to include not only the explicitly recited values of about 1 to 5, but also include individual values and sub-ranges within the indicated range. Thus, included in this numerical range are individual values such as 2, 3, and 4 and sub-ranges such as 1-3, 2-4, and 3-5, etc. This same principle applies to ranges reciting only one numerical value and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Turning now to the present invention, FIG. 1 illustrates a sensor system in accordance with some embodiments of the present invention. The system 100 can include a plurality of sensor nodes 102. The sensor nodes can be mobile or fixed. For example, the sensor nodes can be dispersed over an area of interest, deployed along a border, or in other arrangements. The sensor nodes can include one or more sensors of various types, such as seismic or vibration sensors, chemical sensors, biological sensors, radiation sensors (e.g., electromagnetic, ionizing, radio frequency, optical, infrared, etc.), meteorological sensors, etc. Each sensor node can include a transmitter capable of transmitting sensor data using a spread spectrum encoded pulse. For example, the transmitter can be enabled to transmit sensor data when a predefined sensor condition is detected (e.g., sensed levels exceed a threshold, certain signatures are detected, etc.).

By transmitting the sensor data using a spread spectrum encoded pulse, position location of the sensor can be economically achieved as will now be described. The system 100 can include a plurality of mobile nodes 104. The mobile nodes can thus have different, varying locations. Mobile nodes can be, for example ground vehicles, aircraft, unmanned aerial vehicles, satellites, handheld equipment, etc. Each mobile node can be capable of receiving the spread spectrum encoded pulses from the sensor node 102 and determining a time of arrival of the spread spectrum encoded pulse. The time of arrival may be determined using a time reference or in a relative sense as described further below.

A location calculation unit 106 can calculate the location of the sensor node using the time of arrival information and known locations of the mobile nodes. The location calculation unit can be in communication with each of the mobile nodes to accept time of arrival information from the mobile nodes. The location calculation can be disposed on one of the mobile units, for example, as shown here, or the location calculation unit can be located separately from the mobile units. When the spread spectrum encoded pulse is received at three or more of the mobile nodes, a location of the transmitting sensor can be determined.

For example, in some embodiments of the invention, trilateration can be performed as follows. If the spread pulse is transmitted from the sensor at a known time, based on the arrival time of the pulse at each of several mobile nodes, a range from the mobile nodes to the sensor node can be determined. For each mobile node, the range measurement corresponds to a sphere in space with the mobile node at the center. The sensor node can reside anywhere on the surface of the sphere. By combing three or more range measurements, the location of the sensor node can be determined uniquely based on the intersection of the three spheres. In some situations (e.g., where partial information about the location is already known), fewer range measurements may be sufficient. While three range measurements are usually sufficient to determine the location (within some degree of uncertainty), when more range measurements are available they can be combined to reduce the uncertainty. The mathematics of performing trilateration is well known and thus need not be presented here.

As another example, in some embodiments of the invention, multilateration can be performed. The spread pulse is transmitted at an unknown time, and time of arrival is measured at each of several of the mobile nodes. Since the time of transmission is unknown, it may not be possible to determine a range directly. Instead, time differences between the arrivals can be determined. Accordingly, an absolute timing reference is not needed when the mobile nodes make time measurements relative to (or traceable to) a common time reference. Each time difference corresponds to a hyperboloid surface in space on which the sensor node can be located. By using four mobile nodes, three time differences can be determined, and the location of the sensor node can be determined uniquely from the resulting intersection of the hyperboloids. In some situations, less than four measurements may be sufficient, and conversely, when more than four measurements are available, they can be combined to improve accuracy. The mathematics of performing multilateration is well known and thus need not be presented here.

Although a single location calculation unit 106 is shown here as disposed on a mobile node 104, the system is not so-limited. Multiple location calculation units can be provided, with a location calculation unit disposed on some or all of the mobile nodes. As another example, one or more location calculation units can be provided separate from the mobile nodes.

While trilateration and multilateration have been described above, other positioning techniques can also be used in some embodiments of the present invention, including for example, hybrids of the above, and combinations of the above with other techniques (e.g., triangulation, signal strength based ranging, etc.).

Various ways of communicating the time of arrival information from the mobile nodes 104 to the location calculation unit 106 can be used. For example, a wireless (e.g., radio or optical) communication system can be used to relay the time of arrival information in some embodiments. The wireless communication system can be dedicated to the transmission of time arrival information, or the wireless communication system can be shared with other uses.

In some situations, the location of the sensor node may not be determined exactly, due to errors in the timing measurements and other factors. One benefit of using a spread spectrum waveform is that accurate timing can be obtained using correlation techniques.

Spread spectrum transmission can use frequency hopping, direct sequence, combinations thereof, and other techniques. As a particular example, direct sequence spreading can be performed wherein a high rate pseudo-noise sequence is combined with the sensor data transmission. For example, using a direct sequence chip rate of about 10 MHz, the chip duration is about 100 ns. Timing measurements can be resolved to a fraction of a chip time, for example about 5% of the chip duration, which for this example equals 5 ns, corresponding to about 1.5 meter location accuracy. Higher chipping rates can provide greater location accuracy, while higher chipping rates with less timing resolution (e.g., about 100 MHz with about 50% measurement accuracy) can provide similar accuracy to lower chipping rates with higher timing resolution. Selection of chipping rate and timing resolution can be varied depending on the application.

Because the amount of sensor data to be transmitted may be relatively low (e.g., tens or hundreds of bits of information), relatively low data rates for the sensor data transmission can be used (e.g., 1 kb/s or less) in some embodiments. Low data rate transmission can desirable, as the amount of power required for communication of data is generally proportionally to the data rate, with higher data rates using higher powers. Accordingly, power requirements can be reduced by using low data rates.

As noted above, however, high chipping rates can be helpful in providing accurate location information. Accordingly, the spread factor (either measured as the ratio of pseudo-noise chip rate to sensor information bit rate, or measured as the ratio of spread signal bandwidth to sensor information bandwidth) can be quite high in some embodiments. For example, using a chipping rate of 100 MHz and a sensor data bit transmission rate of 10,000 kHz results in a spread factor of about $10^4$ or about 40 dB. In general, spread factors may be higher or lower than 40 dB.

Another benefit of using a spread spectrum waveform is that the sensor transmissions can be difficult to detect if the spreading code is not known. Such low probability of detection transmissions can be useful in warfare scenarios, where it is desirable for the presence of the sensors to remain covert. Generally, with higher spread factors, detection of the signal becomes more difficult without knowing the spreading code, and spread factors of 40 dB or greater can be very advantageous in this respect.

Low probability of detection by an adversary can be further enhanced by using a low duty cycle for transmission from the sensors. For example, a 100-bit sensor data transmission can be transmitted in about 0.1 second at a 1 kHz modulation rate. If the data transmission is repeated at a rate of about once every 10 seconds, the resulting transmission duty cycle is about 1 percent. Of course, very low duty cycles can be used, such as less than 1 percent, less than 0.1 percent, and less than 0.01 percent. For example, a sensor might transmit can transmit a few hundred bits of status information once per day, resulting in a duty cycle of $10^{-5}$ or $10^{-6}$. Such low duty cycle transmissions, combined with high spread factor spread spectrum encoding can be very difficult for an adversary to intercept.

For periodic transmission, the intervals between transmissions can also be varied to further complicate detection by an adversary. For example, repetitive transmissions can be repeated at pseudorandom time intervals.

Note that the sensor nodes 102 need not include a receiver. Nor need the sensor nodes know their location or the time of day. For example, since the sensor nodes need not know anything about their location, there need not be a GPS receiver included in the sensor node. By avoiding the inclusion of a receiver in the sensor nodes, their power consumption can be reduced, allowing for smaller batteries, solar panels, or other power sources.

As mentioned above, high spread factors, such as 40 dB or more can be used in the system. At such high spread factors, the use of layered direct sequence codes can provide for simpler receiver implementations, as will become apparent below.

Figure 2:
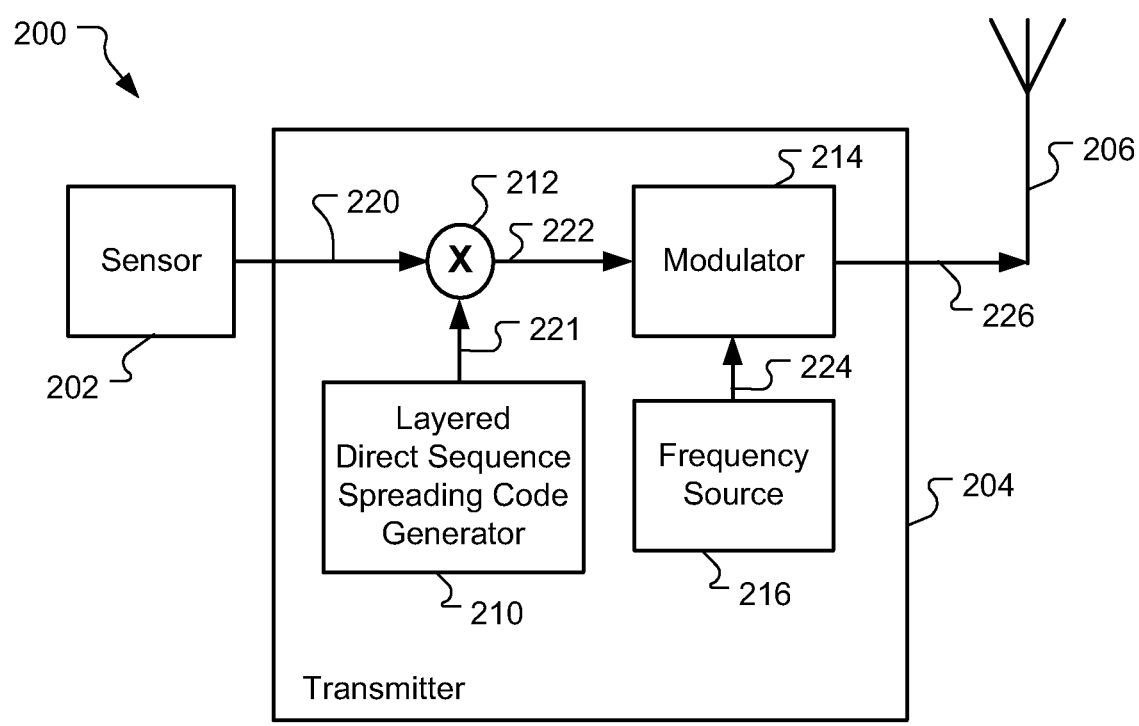
FIG. 2 is a block diagram of a sensor node in accordance with some embodiments of the present invention.

FIG. 2 illustrates a sensor node in accordance with some embodiments of the present invention. The sensor node 200 can include one or more sensors 202 (e.g., as described above), a transmitter 204, and an antenna 206. In some embodiments of the present invention, the transmitter can include a layered spreading code generator 210, a multiplier (exclusive OR) 212, a modulator 214, and a frequency source 216. Data 220 from the sensor is multiplied (exclusive or'd) with the pseudo noise sequence 221 from the layered spreading code generator to produce spread data 222, which can be modulated onto the carrier frequency 224 to produce a radio signal 226 for transmission by the antenna. Other embodiments of a transmitter can include creating baseband modulation which is upconverted to the carrier frequency, direct modulation of a frequency source, and similar arrangements.

Figure 3:
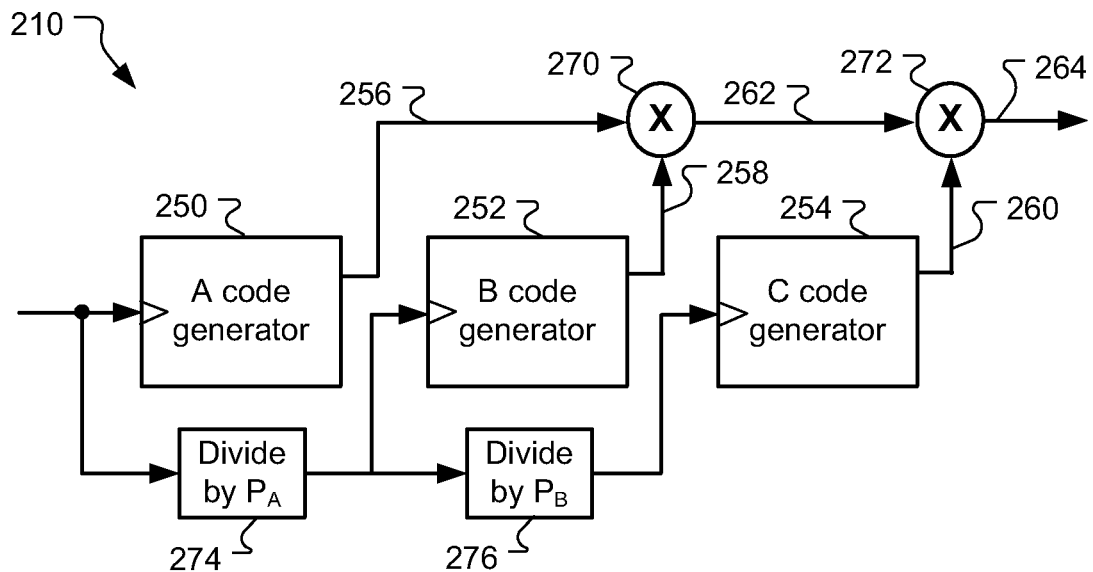
FIG. 3 is a block diagram of a layered spreading code generator in accordance with some embodiments of the present invention.

FIG. 3 provides further detail of some embodiments of a spreading code generator 210 in accordance with some embodiments of the present invention. The spreading code generator can generate a nested three level layered pseudonoise code, referred to here as the ABC code. The ABC code is produced using three sub-code generators 250, 252, 254, which produce respectively an A code 256 having length $P_A$, a B code 258 having length $P_B$, and a C code 260 having length $P_C$. The component codes are combined with multipliers (exclusive OR) 270, 272 and clocked through dividers 274, 276. The A-code generator is clocked at the chip rate, and thus the A code repeats every $P_A$ chips. The B-code generator is clocked at $1/P_A$ of the chip rate, and thus the B code repeats every $P_A*P_B$ chips, but only changes after every $P_A$ chips. By multiplying the A-code and the B-code together, the AB code 262 is obtained which changes every chip, and repeats every $P_A*P_B$ chips.

While two levels of code are sufficient to create a layered code, more levels can be used. For example, a third layer is provided by the spreading code generator 210 illustrated in FIG. 3. The C-code generator 254 is clocked at $1/(P_AP_B)$ of the chip rate, and produces the output C code 260 which repeats every $P_A*P_B*P_C$ chips, but only changes every $P_A*P_B$ chips. The AB code and C code are multiplied together to form the ABC code 264, which changes every chip, and repeats every $P_A*P_B*P_C$ chips.

The resulting layered code can be described in terms of the individual chips of the component sub-codes as follows. Designating the chips of the A-code as $A_1 \ldots A_{PA}$, the chips of the B-code as $B_1 \ldots B_{PB}$, and the chips of the C-code as $C_1 \ldots C_{PB}$, the resulting code sequence can be expressed as: $A_1B_1C_1, A_2B_1C_1, A_3B_1C_1 \ldots A_{PA}B_1C_1, A_1B_2C_1, A_2B_2C_1, A_3B_2C_1, \ldots A_{PA}B_2C_1, A_1B_3C_1, \ldots A_{PA}B_{PB}C_1, A_1B_1C_2, A_2B_1C_2, \ldots A_{PA}B_{PB}C_2, A_1B_1C_3, \ldots A_{PA}B_{PB}C_{PC}$.

Figure 4:
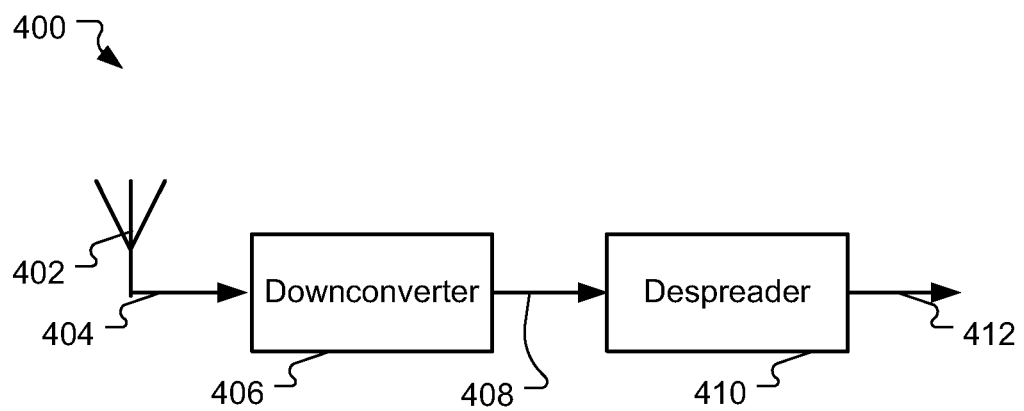
FIG. 4 is a block diagram of a receiver in accordance with some embodiments of the present invention.

FIG. 4 provides a block of a receiver suitable for use in receiving spread spectrum signals from a sensor node in accordance with some embodiments of the present invention. The receiver 400 can include an antenna 402 to receive the spread spectrum signal from the sensor node. The received signal 404 is provided to a downconverter 406 which can downconvert the received signal, for example, to a baseband signal 408. The baseband signal is processed by a correlator or despreader 410, to find a peak correlation time 412. The correlation time may be referenced to absolute time of day or other time reference as described above. For example, the correlation time may be referenced to a time of arrival at a mobile node designated as a master node.

Figure 5:
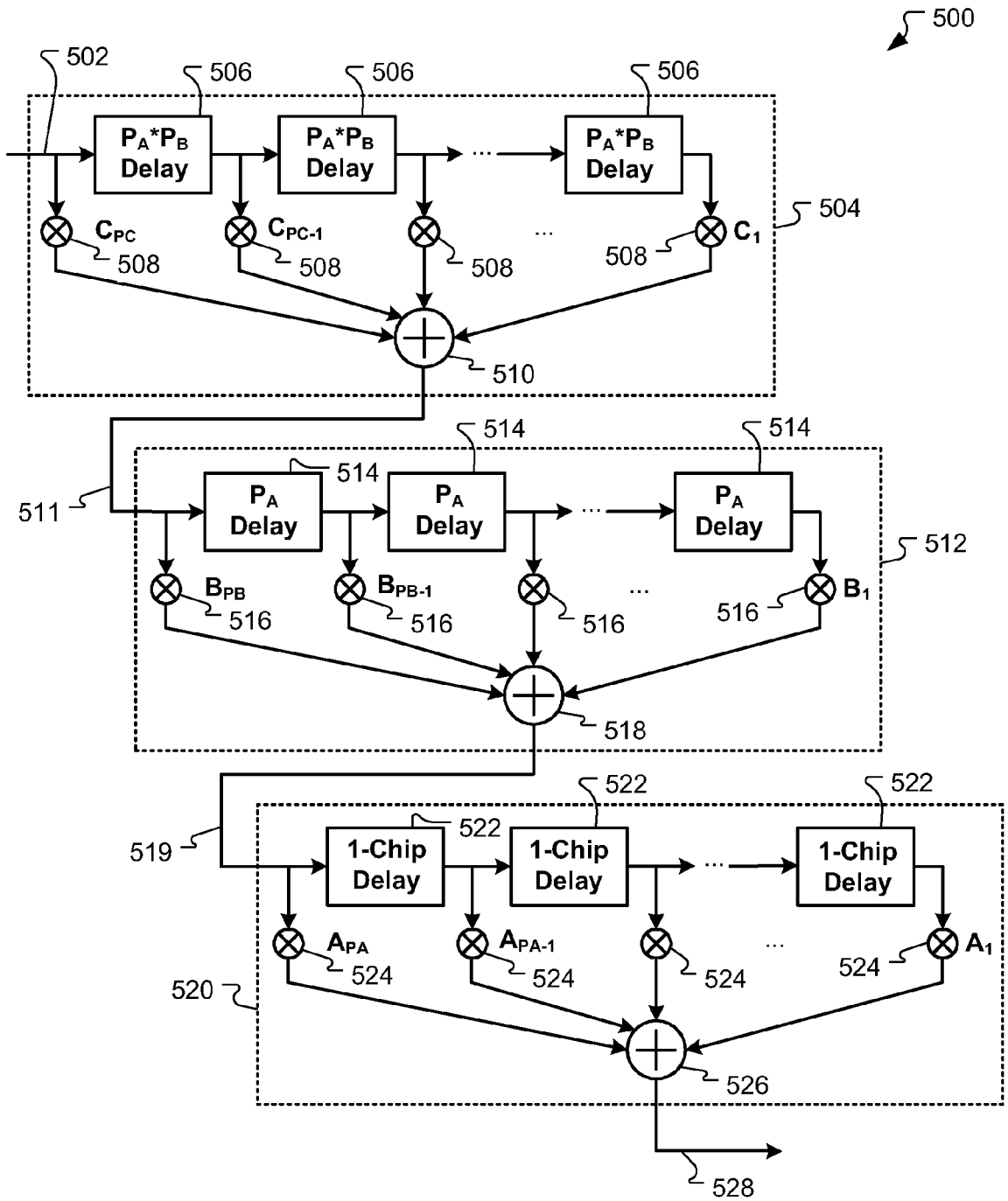
FIG. 5 is a block diagram of a layered despreader in accordance with some embodiments of the present invention.

The use of layered codes can enable an improved efficiency design for the despreader 410. For example, in accordance with some embodiments of the present invention, FIG. 5 illustrates a despreader 500 for a three-level code, for example a layered code generated by the layered spreading code generator 210 illustrated in FIG. 3. The input 502 to the despreader can be, for example a complex baseband digitized signal. The despreader can include three correlation sections 504, 512, 520 corresponding to each of the component subcodes. The first section 504 can include a tapped delay line formed by a series of delay units 506 each providing a delay of $P_A*P_B$ chips. As described above, the A-code and B-code repeat every $P_A*P_B$ chips, hence, for a properly time-aligned input signal, only the C-code portion of the input signal chips are different between each delay unit. Hence, the outputs of the tapped delay line can be multiplied by the C code using multipliers (exclusive ORs) 508, and then summed in a summer 510. The resulting output 511 from the first section has thus had the C code removed.

The second section 512 operates similarly, using a tapped delay line with delay units 514 each having a delay of $P_A$ chips. Since the A code repeats every $P_A$ chips, only the B-code portion of the input is different between each delay unit. Hence, the outputs can be multiplied by the B code using multipliers 516 and then summed by summer 518. The resulting output 519 from the second section has had the B code removed (as well as the C code by the previous section).

The third section 520 uses a tapped delay line with delay units 522 having delays of one chip time and, using multipliers 524 and a summer 526, correlates against the A code to form the final correlation result 528

This structure is considerably simpler than a conventional correlator for a non-layered code. For example, for a code of length 10,000, a conventional correlator uses 10,000 coefficient storage locations and multipliers. Moreover, for each input chip coming in, a sliding correlation performs 10,000 multiply-accumulate operations. In contrast, a layered code of length 10,000 can be formed using three component codes of length 10, 10, and 100, respectively. Thus, 120 coefficient storage locations and multipliers can be used (as compared to 10,000). While more delays and memory may be used by the layered code as compared to a conventional code, the resulting reduction in computation complexity is typically worth this small cost. For example, using the layered code, 120 multiply-accumulate operations can be performed for each input chip to obtain the final correlation result (as compared to 10,000 multiply-accumulate operations for a conventional correlator)—a reduction factor of over 80.

Of course, layered codes are not limited to two or three layers, as described herein, nor are they limited to the particular code lengths described above. Various numbers of layers can be used, and differing code lengths can be used for each layer. Further, while the delays illustrated above were in integer chip vales, sub-chip delays can also be used, e.g. delays of ½ or ¼ chip time to provide for greater timing resolution and reduced loss. Interpolation of correlation results can also be performed to provide improved time resolution.

Returning to FIG. 1, all of the sensor nodes 102 can, if desired, use the same spreading code. This can simplify implementation of the mobile nodes 104, since their receivers can be designed to search for the same code sequence. Interference between sensor node transmissions can avoided by having transmissions from the sensor nodes use different code timing (code phase). For example, if transmissions from the sensor nodes are of low duty cycle and initiated independently from each other, there can be a small probability of overlap. A single receiver can search for transmissions from any sensor node by performing a sliding correlation, searching for the code sequence.

As described above, in some embodiments the system can include various types of surveillance. Accordingly, when a transmission from a sensor node has been received, it can be desirable to use the location of the sensor to initiate other actions, such as for example, dispatching personnel to the location, directing equipment to that location, pointing cameras or antennas toward the location or areas nearby, and similar actions.

Figure 6:
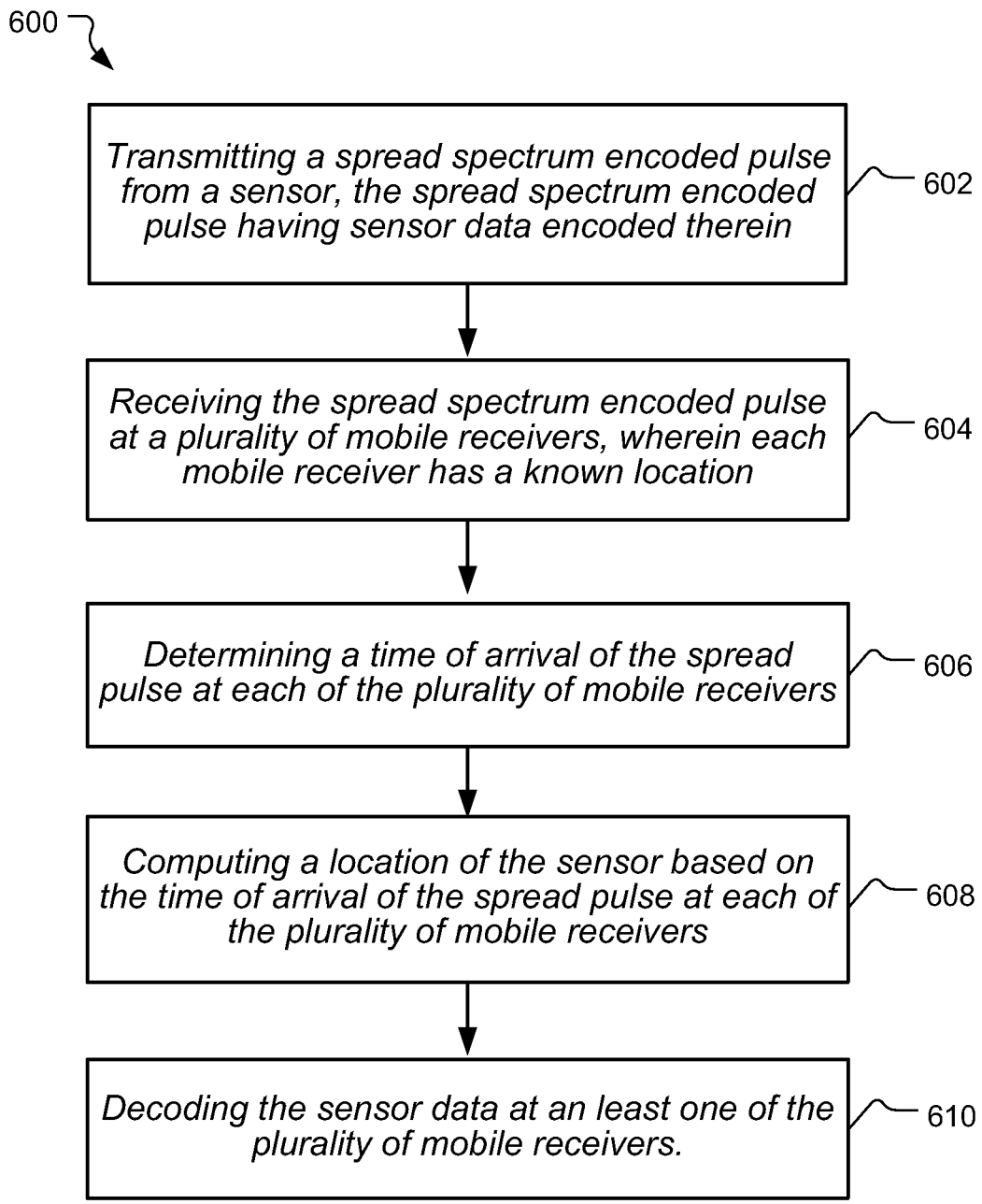
FIG. 6 is a flow chart of a method of locating a sensor in accordance with some embodiments of the present invention.

FIG. 6 provides a flow chart of a method of locating a sensor. The method 600 can include transmitting 602 a spread spectrum encoded pulse from a sensor. The spread spectrum encoded pulse can include sensor data encoded therein. The transmission can be, for example, direct sequence encoded or frequency hopped. As a particular example, a layered direct sequence spreading code can be used. Spread factors of 40 dB or greater can be used. Transmission can be low duty cycle (e.g., 1%, 0.01%, or lower), and can occur at irregular intervals.

The method 600 can also include receiving 604 the spread spectrum encoded pulse at a plurality of mobile receivers and decoding 610 the sensor data at an least one of the plurality of mobile receivers. The decoded sensor data may be displayed or provided to another system for use. The mobile receivers can have known locations. Another operation of the method can include determining 606 a time of arrival of the spread pulse at each of the plurality of mobile receivers. For example, correlation can be performed to determine the peak correlation time of a received spread spectrum burst. The time of arrival of the burst can be measured relative to a time of day or other clock, or measured relative to a timing reference at one of the mobile receivers.

The method 600 can also include computing 608 a location of the sensor based on the time of arrival of the spread pulse at each of the plurality of mobile receivers. For example, ranges, pseudo-ranges, or differential ranges can be computed using the time of arrival information. Location can be, for example, determined using trilateration or multilateration as described above.

Summarizing and reiterating to some extent, a sensor system having an integral sensor locating capability has been disclosed. By using a spread spectrum waveform, sensor nodes can be located whenever they transmit. Low duty cycle, high spread factor transmissions can be used enabling the sensor nodes to maintain a low probability of detection profile. Transmissions can be one way from the sensor nodes to mobile nodes which perform the locating function, simplifying the design of the sensor nodes and reducing their power consumption. High chipping rates (e.g., 10 MHz-100 MHz) can provide highly accurate (e.g., 2 meter or higher resolution) location. Locating can be performed from mobile nodes enabling use of the system by ground, airborne, or space vehicles, and avoiding the need for fixed infrastructure. A single transmission from a sensor node can be received at multiple mobile nodes, helping to enhance the detection of the sensor transmissions. Sensor location can be determined in a relative sense (e.g., relative to mobile nodes) or absolute sense (e.g., latitude and longitude or other fixed coordinate systems).

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system comprising:
   a plurality of sensors, each sensor comprising a transmitter configured to transmit sensor data using a spread spectrum encoded pulse comprising modulated spread sensor data, wherein each sensor further comprises a direct sequence layered spreader configured to output a nested multi-level layered pseudo-noise spreading code that is a product of a first pseudo-noise code multiplied by a second pseudo-noise code, the sensor further comprising a multiplier configured to multiple sensor data by the nested multi-level layered pseudo-noise spreading code to produce the spread sensor data;
   a plurality of mobile nodes, wherein each of the plurality of mobile nodes has a known location and comprises a spread spectrum receiver configured to receive spread spectrum encoded pulses and determine a time of arrival of the spread pulse; and
   a location calculation unit in communication with each of the plurality of mobile nodes and configured to determine a location of any one of the plurality of sensors using time of arrival information of a transmission from the any one of the plurality of sensors wherein the transmission is received by at least three of the plurality of mobile nodes wherein the spread spectrum receiver of each of the plurality of mobile nodes comprises a layered despreader,
   wherein the direct sequence layered spreader comprises:
   an A code generator configured to generate, at a clock rate equal to a chip rate of the first pseudo-noise code, the first pseudo-noise code having a length of $P_A$ chips;
   a B code generator configured to generate at a clock rate equal to $1/P_A$ of the chip rate of the first pseudo-noise code, the second pseudo-noise code having a length of $P_B$ chips, wherein "\" is mathematical division.

2. The system of claim 1, wherein the sensor is mobile.

3. The system of claim 1, wherein the sensor has no radio frequency receiver.

4. The system of claim 1, wherein the direct sequence layered spreader provides a spread factor of 40 dB or greater.

5. The system of claim 1, wherein the sensor is configured to transmit using a duty cycle of less than 1 percent.

6. The system of claim 1, wherein the sensor is configured to transmit using a duty cycle of less than 0.01 percent.

7. The system of claim 1, wherein the sensor is configured to transmit using a chipping rate of at least 100 MHz.

8. The system of claim 1, wherein the location calculation unit is disposed on one of the plurality of mobile nodes.

9. The system of claim 1, wherein the location calculation unit is configured to perform at least one of multilateration and triangulation.

10. The system of claim 1, wherein the direct sequence layered spreader further comprises a multiplier configured to multiply the first pseudo-noise code by the second pseudo-noise code to produce the nested multi-level layered pseudo-noise spreading code.

11. The system of claim 1, wherein the direct sequence layered spreader further comprises:
    a C code generator configured to generate, at a clock rate equal to 1/(PA*PB) of the chip rate of first pseudo-noise code, a third pseudo-noise code having a length of $P_C$ chips; and
    multipliers configured to multiply the first pseudo-noise code by the second pseudo-noise code and the third pseudo-noise code to produce the nested multi-level pseudo-noise spreading code,
    wherein "\" is mathematical division and "*" is mathematical multiplication.

12. A system for determining a sensor location comprising:
    means for transmitting a spread spectrum encoded pulse from a sensor, the spread spectrum encoded pulse comprising modulated spread sensor data, wherein the means for transmitting comprises a direct sequence layered spreader configured to output a nested multi-level layered pseudo-noise spreading code that is a product of a first pseudo-noise code multiplied by a second pseudo-noise code, the means for transmitting further comprising a multiplier configured to multiple sensor data by the nested multi-level layered pseudo-noise spreading code to produce the spread sensor data;
    means for receiving the pulse at a plurality of different, varying locations, the locations being known;
    means for determining a time of arrival of the pulse at each of the plurality of different, varying locations; and
    means for computing a location of the sensor based on the time of arrival of the spread pulse at each of the plurality of different, varying locations,
    wherein the direct sequence layered spreader comprises:
    an A code generator configured to generate, at a clock rate equal to a chip rate of the first pseudo-noise code, the first pseudo-noise code having a length of $P_A$ chips;
    a B code generator configured to generate at a clock rate equal to 1/P of the chip rate of the first pseudo-noise code, the second pseudo-noise code having a length of $P_B$ chips, wherein "\" is mathematical division.

13. The system of claim 12, wherein the layered direct sequence spreading code has a processing gain of at least 40 dB, a chipping rate of at least 10 MHz, and a duty cycle of less than 0.01 percent.

14. The system of claim 12, wherein the direct sequence layered spreader further comprises a multiplier configured to multiply the first pseudo-noise code by the second pseudo-noise code to produce the nested multi-level layered pseudo-noise spreading code.

15. The system of claim 12, wherein the direct sequence layered spreader further comprises:
    a C code generator configured to generate, at a clock rate equal to 1/(PA*PB) of the chip rate of first pseudo-noise code, a third pseudo-noise code having a length of $P_C$ chips; and
    multipliers configured to multiply the first pseudo-noise code by the second pseudo-noise code and the third pseudo-noise code to produce the nested multi-level pseudo-noise spreading code,
    wherein "\" is mathematical division and "*" is mathematical multiplication.

16. A method of determining a sensor location comprising:
    generating in a sensor a nested multi-level layered pseudo-noise spreading code that is a product of a first pseudo-noise code multiplied by a second pseudo-noise code;
    multiplying in the sensor data by the nested multi-level layered pseudo-noise spreading code to produce spread sensor data;
    transmitting a spread spectrum encoded pulse from the sensor, the spread spectrum encoded pulse comprising the spread sensor data modulated for transmission;
    receiving the spread spectrum encoded pulse at a plurality of mobile receivers, wherein each mobile receiver has a known location;
    determining a time of arrival of the spread spectrum encoded pulse at each of the plurality of mobile receivers by correlating at each said mobile receiver the spread spectrum encoded pulse received at the mobile receiver;

computing a location of the sensor based on the time of arrival of the spread pulse at each of the plurality of mobile receivers; and decoding the sensor data at at least one of the plurality of mobile receivers, wherein the receiving comprises performing a layered correlation.

17. The method of claim 16, wherein the layered direct sequence spreading code has an overall spreading factor of 40 dB or greater.

18. The method of claim 16, wherein the transmitting comprises transmitting a pulse having a duty cycle of less than 1 percent.

19. The method of claim 16, wherein the transmitting uses a chipping rate of at least 100 MHz.

20. The method of claim 19, wherein the determining a time of arrival is performed with an accuracy of 10 ns or better.

21. The method of claim 16, wherein the computing a location is performed with an accuracy of 3 meter or better relative to the locations of the mobile receivers.

22. The method of claim 16, wherein the sensor is mobile.

23. The method of claim 22, wherein the sensor has no knowledge of a current position of the sensor.

24. The method of claim 16, wherein the sensor has no knowledge of time of day.

25. The method of claim 16, wherein the computing a location of the sensor comprises performing multilateration using differences between the time of arrival of the spread pulse at each of the plurality of mobile receivers.

26. The method of claim 16, wherein the computing a location of the sensor comprises:

determining a propagation delay between the sensor and each of the plurality of receivers based on a transmission time of the spread spectrum encoded pulse; and computing the location of the sensor using triangulation based on the propagation delay between the sensor and each of the plurality of receivers.

27. The method of claim 16, wherein the transmitting is initiated in response to a predefined sensor condition.

28. The method of claim 16, wherein the transmitting is repeated at a pseudorandom time interval.

29. The method of claim 16, further comprising using the location of the sensor to point an antenna toward the sensor.

30. The method of claim 16, further comprising using the location of the sensor to point a camera in the vicinity of the sensor.

31. The method of claim 16, wherein the generating step comprises:

generating at a clock rate equal to a chip rate of the first pseudo-noise code the first pseudo-noise code having a length of $P_A$ chips;

generating at a clock rate equal to $1/P_A$ of the chip rate of first pseudo-noise code the second pseudo-noise code having a length of $P_B$ chips, wherein "\" is mathematical division.

32. The method of claim 31, wherein the generating step further comprises multiplying the first pseudo-noise code by the second pseudo-noise code to produce the nested multi-level layered pseudo-noise spreading code.

33. The method of claim 31, wherein the generating step further comprises:

generating at a clock rate equal to 1/(PA*PB) of the chip rate of first pseudo-noise code a third pseudo-noise code having a length of $P_C$ chips; and multiplying the first pseudo-noise code by the second pseudo-noise code and the third pseudo-noise code to produce the nested multi-level pseudo-noise spreading code, wherein "\" is mathematical division and "*" is mathematical multiplication.

* * * * *